United States Patent
Greiner

[15] 3,695,038
[45] Oct. 3, 1972

[54] INSTALLATION OR PLANT CONTROL DEVICE, IN PARTICULAR FOR GAS-TURBINE POWER PLANTS

[72] Inventor: Gerard Greiner, Vincennes, France

[73] Assignee: Societe Nationale D'Etude Et De Construction De Moteurs D'Aviation, Paris, France

[22] Filed: Nov. 13, 1970

[21] Appl. No.: 89,408

[30] Foreign Application Priority Data

Nov. 14, 1969  France......................6939274

[52] U.S. Cl.............................................60/39.28
[51] Int. Cl..............................................F02c 9/04
[58] Field of Search........60/39.28, 243; 137/117, 58

[56] References Cited

UNITED STATES PATENTS

| | | | |
|---|---|---|---|
| 3,106,934 | 10/1963 | Rogers | 60/39.28 R |
| 3,123,128 | 3/1964 | Zeisloff | 60/39.28 R |
| 3,371,698 | 3/1968 | Hitzelberger | 60/39.28 R |

Primary Examiner—Carlton R. Croyle
Assistant Examiner—Robert E. Garrett
Attorney—William J. Daniel

[57] ABSTRACT

In and for an installation supplied with liquid through a piping system, such as a gas-turbine plant supplied with fuel, a device for controlling the liquid supply as a function of an installation operating condition, such as turbine rotor speed, said device being of the kind in which fuel flow through a metering passage is regulated by a controller responsive to change in said condition, wherein in accordance with the invention separate adjusting means are provided for varying the cross-sectional area of the metering passage and for varying the liquid pressure drop therethrough, and separate controllers, one of the integrating action type and one of the proportional action type, are provided for the respective varying means.

10 Claims, 2 Drawing Figures

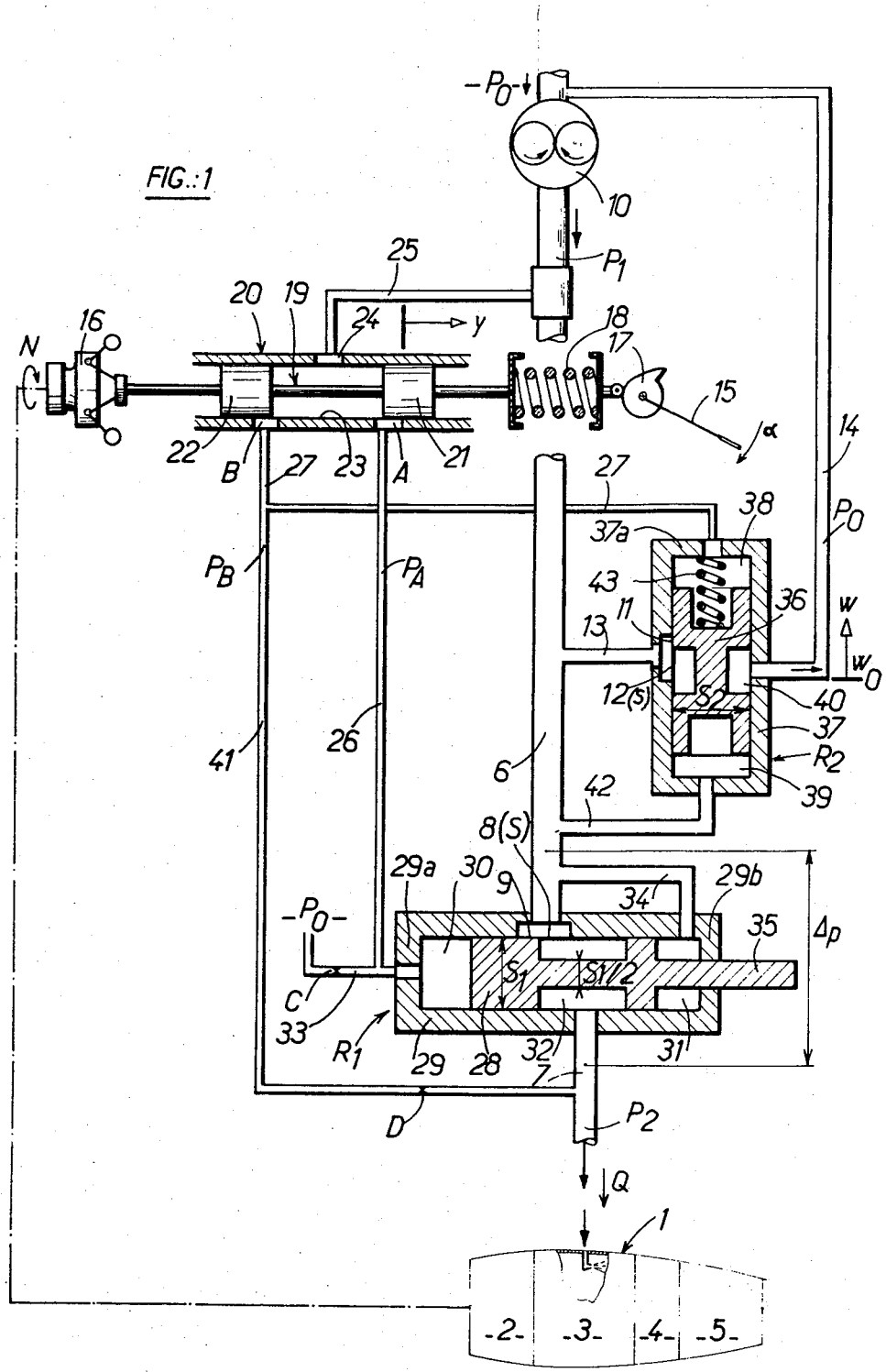
FIG.:1

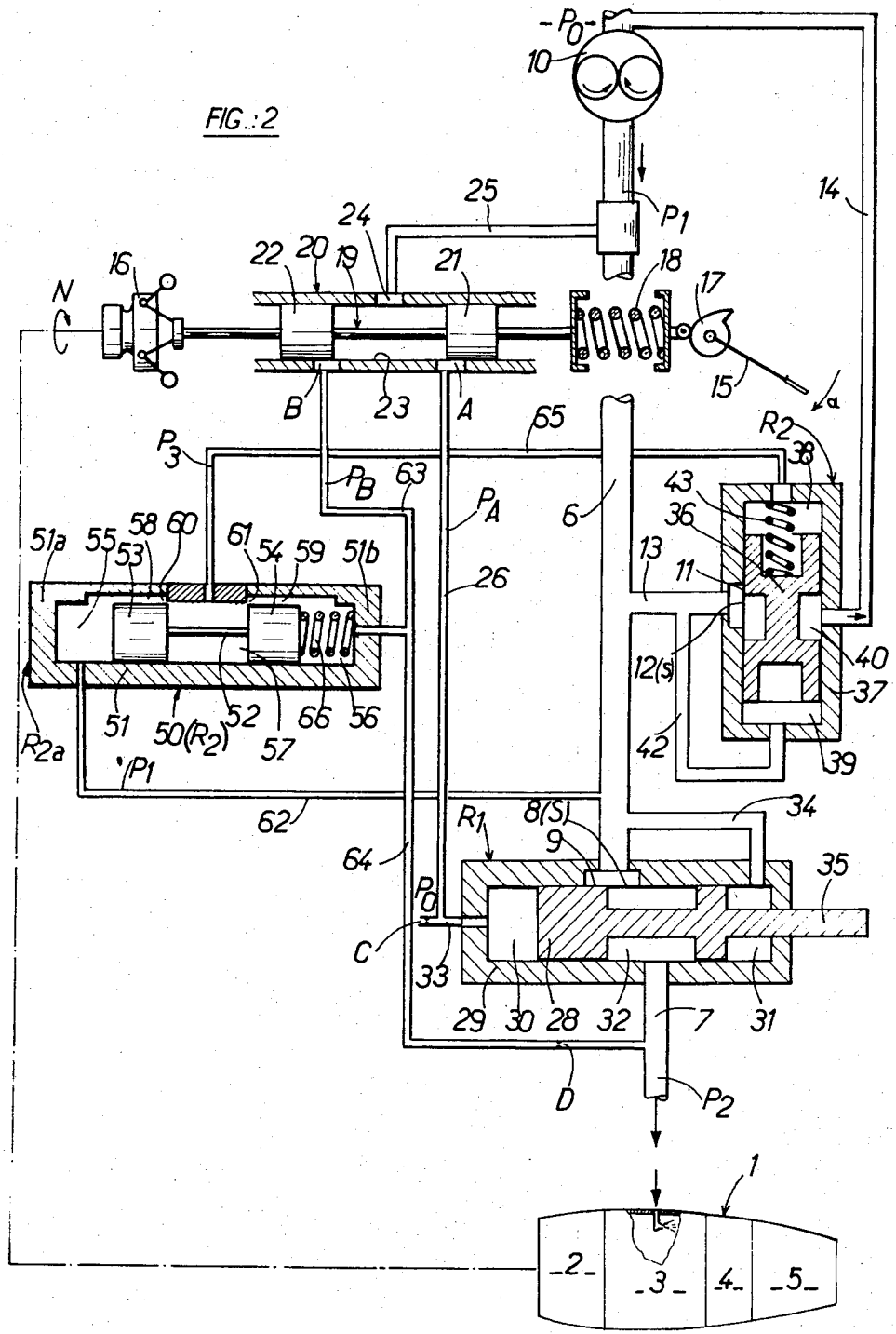

INSTALLATION OR PLANT CONTROL DEVICE, IN PARTICULAR FOR GAS-TURBINE POWER PLANTS

This invention relates to a device for controlling an installation or plant as a function of changes in a parameter or operating condition thereof, by variation of the flow rate of a pressurized liquid supplied to said installation or plant.

In order to vary the effective flow rate of the liquid supplied to an installation or plant, it is known to employ a metering device arranged in a piping system through which the liquid is supplied to said installation or plant. Such a metering device generally comprises a dosing passage of variable cross-sectional area S and is more often than not associated with means for regulating or maintaining constant the pressure drop $\Delta p$ in the liquid flowing through said metering passage. In the latter case, the flow rate of liquid supplied to the installation is then simply a function of the cross-sectional area S of the metering passage. Metering devices of this kind are, in particular, used widely for controlling the rate of fuel supply to gas-turbine power plants, in particular as a function of variation $\Delta N$ in the speed of operation of the power plant rotor, and in the ensuing description reference will be made, by way of a non-limitative example, to such a tachometric control.

In the field of control systems the requirements of accuracy in steady state operation, and of good stability and small response time in transient operation, are contradictory and necessitate the use of controllers having different kinds of responses. Thus, controllers of the proportional action type (P-controllers) are known, these being devices which, in response to a sudden variation in the signal applied to them (for example a change $\Delta N$ in the rotor speed), effect a sudden and proportional variation in a control quantity (for example the flow rate Q of fuel supplied to the combustion chamber). Thus, we have $\Delta Q = K_1 \Delta N$. Likewise, controllers are known which, for a sudden variation $\Delta N$ in the signal applied to them, respond with a rate of variation $dQ/dt$ in the control quantity, which is proportional to the change $\Delta N$. Thus we have $dQ/dt = k_2 \Delta N$ or, $\Delta Q = k_2 \int \Delta N.dt$. The change $\Delta Q$ is thus proportional to the integral with respect to time, of the change $\Delta N$. Controllers of this kind are known as controllers of the integrating action type (I-controllers).

Each of these types of controller has its advantages and disadvantages, which are well known to those skilled in the art. In particular, it may be mentioned that, because of their small response time, P-controllers are especially suited to transient condition control whereas I-controllers, being much more accurate and not giving rise to droop errors, are preferred for steady state condition control. For these reasons, frequently controllers known as PI-controllers are used, which combine the functions of the aforesaid two types, namely proportional and integrating action controllers, by acting "in parallel" on one and the same control condition.

In the case envisaged by the invention, this control condition is constituted by the flow rate Q which itself depends, on two intermediate control conditions namely the cross-sectional area S of the metering passage and the pressure drop $\Delta p$ in the liquid in passing through said passage.

In the known controllers, only one of the intermediate control conditions (generally the cross-sectional area S), reacts to the variations in the parameter being monitored (for example the speed $N$ of the rotor in the case of a gas-turbine power plant) through the medium of the PI-controller referred to above, the other intermediate control condition being kept constant or responding, possibly, to variations in some other parameter.

It appears, nevertheless, that the accumulation, in respect of one and the same intermediate control condition, not merely of the qualities but also of the defects of the two types of controllers aforementioned, may in certain cases by undesirable.

The object of the invention, within the context of control of the general type described, is to provide better separation between the two types of control action (proportional and integrating action type) by distributing or separating these actions amongst the two intermediate control quantities (namely the cross-sectional area S of the metering passage and the pressure drop $\Delta p$ in the liquid flowing through said metering passage).

To this end, there is provided a device for controlling an installation or plant as a function of changes in a parameter or operating condition of said installation, by variation of the flow rate of a liquid which is fed to said installation or plant through a piping system, said device comprising a detector for detecting the changes in said condition, a metering passage provided in said piping system, first adjusting means for varying the cross-sectional area of said metering passage and second adjusting means for varying the pressure drop in the liquid flowing through said passage, a first and a second controller each responsive to said detector and respectively controlling said first and said second adjusting means, one of said controllers being of proportional action type and the other being of integrating action type.

Preferably, that of the controllers which controls the adjusting means for varying the pressure drop will be the proportional action controller, whilst the other is the integrating action controller.

In accordance with one advantageous embodiment, the detector comprises a pilot valve, supplied with liquid at the pressure prevailing upstream of the metering passage, in which there is movably accommodated a spool whose position is a function of the changes in the said condition, said pilot valve comprising two outlet ports cooperating with said spool in such a manner that the sum of their exposed cross-sectional areas is constant, said ports being connected with the first and second controllers, respectively.

In the case in which the integrating action type controller comprises a servo piston integral with an element forming part of the adjusting means used to vary the cross-sectional area of the metering dosing passage, said servo piston can be exposed at one of its faces to the pressure prevailing in a chamber supplied with liquid through one of said outlet ports, said chamber communicating, through a first restrictor, with a low-pressure space. As will be explained hereinafter, in this way the integrating action which is required is obtained in a particularly simple manner.

In the case where the proportional action type controller comprises a movable assembly integral with an element forming part of the adjusting means used to vary the pressure drop in the liquid flowing through the metering passage, said movable assembly can be subjected, at one of its faces, to the action of the pressure prevailing in a chamber supplied with liquid through the other outlet port, said chamber communicating, through a second restrictor, with that portion of the piping system which is located downstream of the metering passage. In a manner which will be explained hereinafter, the desired proportional action is thus obtained.

The element which has been referred to in the preceding paragraph can directly control the pressure drop in the liquid flowing through the metering passage, for example by tapping off to a low-pressure space a proportion of the liquid flow supplying the metering device. Equally, however, it may constitute the moving spool of a servo valve associated with a power stage controlling said pressure drop.

The following description relating to the accompanying drawing, which is given by way of a non-limitative example, will indicate how the invention may be carried into practice. In the drawings:

FIG. 1 is a diagram of a control device in accordance with the invention;

FIG. 2 is a similar diagram illustrating a variant embodiment.

In the figures, the general reference 1 is used to indicate an installation equipped with a control device in accordance with the invention. In the example chosen, this installation is constituted by a gas-turbine jet propulsion power plant with a compressor 2, a combustion chamber 3, a turbine 4 driving the compressor 2, and a jet pipe tube 5 terminating in a nozzle. The combustion chamber 3 is supplied with liquid fuel under pressure through a piping system 6, 7 in which is interposed a metering passage 8 whose cross-sectional area S can be varied by first adjusting means constituted, in this instance, by a metering valve 9. The liquid flowing through the piping system 6, 7 is pressurized by a pump 10, for example of the fixed displacement type. Second adjusting means enable the pressure drop $\Delta p$ in the fuel flowing through the passage 8, to be varied.

In the example illustrated, these second adjusting means comprise a control valve 11 cooperating with a by-pass opening 12 whose cross-sectional area $s$ can be varied as a function of the position of the valve 11, said by-pass opening being formed in a by-pass piping system 13, 14. Depending upon the position of the control valve 11, a variable fraction of the fuel flow delivered by the pump 10 is returned to the suction side of the pump. In the case where the pump 10 is of the variable delivery type, the control of the pressure drop $\Delta p$, instead of being produced by recirculating a certain fraction of the flow through a by-pass piping system such as a 13, 14, can be effected by a modifying the pump delivery rate. The flow rate of fuel supplying the combustion chamber 3, which flow rate will in future be marked Q, is thus a function both of S and $s$.

In operation, the rotor of the power plant rotates at a speed N which is detected by a system of weights 16 and compared with a scheduled speed $N_0$, constant or variable, determined by the angular position $\alpha$ of a handle 15 which acts through a cam 17 on the spring 18. Neglecting friction, in the equilibrium condition the centrifugal force of the weight is equal to the opposing reaction force of the spring so that a spool 19 associated with a pilot valve 20 is in its neutral position. An imbalance between these forces, due to the occurrence of a deviation in speed of $\Delta N$ (produced either by a variation in N or by a variation in $N_0$), displaces the spool 19. The pilot valve 20 thus acts as a detector of the deviations $\Delta N$.

In the known control devices, a deviation $\Delta N$ detected by the pilot valve 20 serves as an input signal to a single controller, generally a PI-controller, acting upon one or other of the adjusting means 9 or 11 in the desired direction, in order to reduce the deviation $\Delta N$ until the scheduled speed of rotation is reached with the result that equilibrium is re-established between the spring force and the centrifugal force on the weights, returning the spool 19 to its neutral position. Normally, in the prior art, control is effected by acting on the cross-sectional area S of the metering passage 8, the means for adjusting the cross-sectional area $s$ simply operating in order to maintain constant the pressure drop $\Delta p$ in the liquid flowing through the metering passage 8 so that the flow of fuel arriving in the combustion chamber is purely a function of the cross-sectional area S.

In accordance with the invention, by contrast, two controllers $R_1$ and $R_2$ are used which respectively control the means 9 and the means 11 which regulate the cross-sectional areas S and $s$, one of said controllers (preferably the controller $R_1$) being of the integrating action type whilst the other is of the proportional action type.

The spool 19 carries two pistons or lands 21, 22 sliding in a cylinder 23 in which an inlet port 24 and two outlet ports A, B are formed.

The inlet port 24 provides communication, through a line 25, between the space defined between the two pistons 21, 22, and that part of the pipe 6 situated between the pump 10 and the metering passage 8. The outlet ports A and B are connected, through conduit means 26, 27 respectively to the controller $R_1$ and the controller $R_2$. These ports are partially exposed by the two pistons of the spool 19 when the latter is in the neutral position and their arrangement is such that at any instant throughout the range of displacements of the spool, the sum of their unobstructed areas is constant.

The controller $R_1$ comprises a servo piston 28 integral with an element forming part of the means used to adjust the cross-sectional area S of the metering passage, in the present case the valve 9. The servo piston 28 and the valve 9 constitute together a movable assembly which, in a cylinder 29 closed off by two end covers 29a, 29b, defines three chambers 30, 31, 32. The chamber 30 communicates through the conduit means 26 with the port A and through a conduit arrangement 33 in which a first restriction C is located, with a low-pressure space $P_0$. The chamber 31 communicates through a conduit means 34 with a part of the piping system 6 which is located upstream of the metering passage 8. The chamber 32 passes the metered fuel coming from the metering passage 8 and communicates, through the piping system 7, with the combustion chamber 3. A rod 35 integral with the movable assembly projects through the end cover 29b outside the cylinder 29.

The controller $R_2$ likewise comprises a movable assembly 36 integral with an element, in the present instance the control valve 11, forming part of the adjusting means used to vary the pressure drop in the fuel flowing through the metering passage 8. The movable assembly 36 and the control valve 11 are accommodated in a cylinder 37 in which they define three chambers 38, 39, 40. The chamber 38 communicates through the medium of the lines 27 with the port B and, through the medium of a line 41 in which a second restriction D is arranged, with the piping system 7 downstream of the metering passage 8. The chamber 39 communicates through a line 42 with a part of the piping system 6 which is located upstream of the metering passage 8.

Finally, the chamber 40 passes that proportion, varying in accordance with the position of the control valve 11, of the fuel flow which is recirculated by the by-pass piping system 13, 14 to the suction side of the pump 10. The reference numeral 43 marks a spring seating on the movable assembly 36 and on one end cover 37a of the cylinder 37.

The control device is located in a housing, not shown, in which the low-pressure $P_0$ already referred to hereinbefore prevails and which is substantially equal to the pump input pressure (pump 10).

The following is a list of symbols and their meanings:
$P_1$ is the delivery pressure of the pump 10, that is to say the pressure of the fuel upstream of the metering passage 8,
$P_2$ is the fuel pressure downstream of the metering passage 8,
$\Delta P = P_1 - P_2$ is the pressure drop through the metering passage 8,
$P_A$ is the pressure in the line 26 connected to the outlet port A,
$P_B$ is the pressure in the line 41 connected to the outlet port B;
$S_1$ is the cross-sectional area of the servo piston 28 associated with the controller $R_1$,
$S_2$ is the cross-sectional area of the movable assembly 36 associated with the controller $R_2$,
$Q$ is the effective flow rate of the fuel supplying the combustion chamber 3,
$Y$ is a point on the abscissae defining the position of the spool 19 ($y = 0$ when the spool is in the neutral position),
$W$ is a point on the abscissae defining the position of the control valve 11,
$W_0$ is a point on the abscissae defining the position of said valve when the force of the spring 43 is zero.

To simply matters, it will be assumed that the cross-sectional area of the rod 35 of the servo piston 28 is equal to $S_1/2$.

The operation of the controllers $R_1$ and $R_2$ is now considered.

The servo piston 28 associated with the controller $R_1$ is subjected to the pressures prevailing in the chambers 30 and 31 (the actions of the pressure in the central chamber 32, compensate one another), and to any forces exerted on the rod 35. In equilibrium, the fuel flow rate through the exposed area of the outlet port A is equal to that escaping through the restrictor C so that:

$$P_A \times S_1 = (P_1 + P_0) \frac{S_1}{2}$$

from which:

$$P_A = \frac{P_1 + P_0}{2} \qquad (1)$$

or again:

$$P_1 - P_A = P_A - P_0$$

This latter expression indicates that the pressure drops across the outlet point A and the restriction C are equal in the equilibrium condition, implying (because of the equality of the flow rates passing through the outlet port A and the restrictor C), that the exposed area of the outlet port A is at that instant equal to the cross-sectional area of the restriction C. By appropriate dimensioning of this restriction, it can be arranged that the condition (1) is only achieved for that position of the spool 19 in which $y = 0$, where the exposed areas and the outlet ports A and B are equal. This position corresponds to the case in which the deviation $\Delta N$ is zero.

The fuel flow rates through the port B and the restriction D being the same, we can, on the other hand, write:

$$\lambda_B \times S_B \times \sqrt{P_1 - P_B} = \lambda_D \times S_D \times \sqrt{P_B - P_2} \qquad (2)$$

$\lambda_B$ and $\lambda_D$, $S_B$ and $S_D$ respectively being the flow coefficients and cross-sectional areas of the port B and restriction D.

This relationship can also be written as:

$$\frac{P_1 - P_B}{P_B - P_2} = \frac{(\lambda_D \times S_D)^2}{(\lambda_B \times S_B)^2}$$

from which:

$$\frac{P_1 - P_B}{P_1 - P_2} = \frac{(\lambda_D \times S_D)^2}{(\lambda_B \times S_B)^2 + (\lambda_D \times S_D)^2} \qquad (3)$$

By equating the second term of equation (3) to $\beta$ ($\beta > 1$), we obtain:

$$P_1 - P_B = \beta \times (P_1 - P_2) \qquad 4$$

This latter relationship states that the pressure drop across the port B is a predetermined fraction of the total pressure drop $P_1 - P_2$ across the circuit 25 – 24 – B – D – 7.

This pressure drop $P_1 - P_2 = \Delta P$ is also produced across the metering passage 8 and is in fact the pressure drop which is to be controlled by the controller $R_2$ by variation, with the help of the control valve 11, of the cross-sectional area $s$ of the recycling passage 12.

The movable assembly 36 associated with the controller $R_2$ is subjected to the forces exerted by the pressure prevailing in the chambers 38 and 39 and to the force produced by the spring 43.

In the equilibrium condition:

$$P_1 - P_B = R/S_2 \times \Delta w \qquad 5$$

$R$ being the rate of the spring and $\Delta w = w - w_0$ measuring the displacement of the movable assembly 36 in the cylinder 37 as explained hereinbefore.

By eliminating $P_B$ from the equations (4) and (5):

$$P_1 - P_2 = \frac{1}{\beta} \times \frac{R}{S_2} \times \Delta_w \qquad (6)$$

The control device in accordance with the invention operates as follows.

Assuming that a step signal is applied to the control device, corresponding to a deviation $\Delta N$, this deviation possibly arising from the fact that the power plant changes its operating condition as a consequence, for example, of conditions of flight and/or differing altitude or a modification in the value $N_o$ scheduled by the pilot. Let us assume, for example, that the case in which $\Delta N > o$ applies.

There will be a consequent acceleration of the rotor which will produce an increase in the centrifugal force on the weights. These latter will move apart and the spool 19 will be displaced towards the right (in the figure) compressing the spring 18 until the latter's load balances the action of the new centrifugal force. The result is that the outlet port A is opened further whilst the outlet port B is restricted. The pressure $P_A$ rises therefore by $\Delta P_A$ and the pressure $P_B$ drops by $\Delta P_B$.

The fuel flow rate through the outlet port A, under these circumstances exceeds the leakage flow across the restrictor C. This difference in flow rate is compensated for by a displacement, at substantially constant speed, on the part of the servo piston 28 towards the right (in the figure), this reducing the cross-sectional area S of the metering passage 8 and, consequently, the flow rate Q of the fuel supplied to the combustion chamber 3 through the pipe system 7.

This movement on the part of the servo piston 28 is continued as long as the deviation $\Delta N$ persists. If the metering passage takes the form of a rectangular slot, the variation in the cross-sectional area S with time will consequently be linear. For a given $\Delta P_A$, servo piston 28 will shift to the right at a constant rate. Thus, for a given time interval, the total change in position of servo piston 28 will be the sum of the changes per unit time and the total change in the area S will likewise be the sum of the changes therein per unit time. Thus, a deviation $\Delta N$ in the parameter being monitored, corresponds to an integrating action upon the intermediate control quantity S and, consequently, upon the control condition $Q$.

As the cross-sectional area S reduces, the pressure $P_2$ in the pipe system 7 tends to reduce as well. The same applies to the pressure $P_B$ in the line 41. The movable assembly 36 belonging to the controller $R_2$ is then no longer in equilibrium and is displaced upwards (in the figure), by a distance $\Delta w$, compressing the spring 43 until the increase in the latter's load compensates for the reduction in pressure $P_B$.

By subtracting the new equilibrium equation for the piston 36, term by term from the old one (equation (5)), we obtain:

$$\Delta P_1 - \Delta P_B = 'R/S_2 \times \Delta w$$

If we assume that the delivery pressure $P_1$ of the pump varies very little, then the displacement $\Delta w$ of the movable assembly 36 can be assumed to be proportional to the variation in pressure $\Delta P_B$.

For a suitable form on the part of the by-pass opening 12, the variations in the cross-sectional area $s$ of this opening are proportional to the displacement $\Delta w$ and therefore to the pressure variation $P_B$, and ultimately, to the deviations $\Delta N$.

Thus, a deviation $\Delta N$ in the parameter being monitored, corresponds to a proportional action on the intermediate control condition $s$ and, consequently, on the control condition $Q$.

FIG. 2 relates to a variant embodiment of the control device shown in FIG. 1, differing from the latter purely by the fact that the control of the means used to regulate the pressure drop through the metering passage 8, comprise an amplifier stage. The elements which are common to or similar in, these two embodiments, and have already been described, have been given the same references.

The general reference 50 has been used to designate a servo valve unit $R_2A$ with a cylinder 51 closed off by two end covers 51a, 51b, in which cylinder there can slide a movable assembly constituted by a spool 52 with two pistons or lands 53, 54, determining in relation to the cylinder 51 chambers 55, 56 and 57. The lateral wall of the cylinder 51 is equipped, internally, with two sets of grooves 58, 59 the lips of which cooperate with the internal edge of each of the pistons 53, 54 in order to form slots 60, 61 through which fluid can flow.

The chamber 55 is connected, through a line 62, to a portion of the piping system 6 which is located upstream of the metering passage 8. The chamber 56 communicates through a piping means 63, with the outlet port B and, through a line 64 in which the restrictor D is located, with the piping arrangement 7 downstream of the metering passage 8. Finally, the chamber 57 is connected, through a line 65, with the chamber 38 forming part of the adjusting means used to vary the pressure drop across the metering orifice 8. The reference 66 designates a spring which seats at its respective ends, on the spool 52 and on the end cover 51b of the cylinder 51.

In operation, the movable assembly or spool 52 is subjected to the action of the pressures $P_1$ and $P_B$ prevailing respectively in the chambers 55 and 56, and to the action of the spring 66 whose load is proportional to the pressure drop $P_1 - P_B$.

In the central chamber 57 there prevails a pressure $P_3$ which is applied, through the line 65, to one of the faces of the movable assembly 36 (the face where, in the case of FIG. 1, the pressure $P_B$ acted).

In the equilibrium condition, the spool 52 is stationary in a position which depends upon the operating conditions and with which there corresponds a certain pressure $P_3$ defining a given position of the movable assembly 36.

A deviation or step $\Delta N > 0$ produces, as has been seen hereinbefore, a reduction in the pressure $P_B$. The spool 52 of the servo valve 50 is then displaced towards the right (in the figure), so that the slot 61 opens up whilst the slot 60 constricts. Consequently, the pressure $P_3$ reduces causing an upward displacement (in the figure), on the part of the movable assembly 36 controlling the control valve 11. The cross-sectional area $s$ then increases as does the flow of fuel recycled to the suction side of the pump 10. Thus, the control valve 11 is indirectly displaced by the spool 52 of the servo valve 50, the latter being itself piloted by the outlet B. $P_3$ will have some intermediate valve between $P_1$ and $P_B$ and at equilibrium will be greater than $P_B$. As the servo piston shifts to the right, the proportion of $P_3$ derived from $P_1$ decreases, and $P_3$ drops at a rate faster than the variation in $P_B$ alone. Thus, servo $R_2a$ acts to magnify (or amplify) the changes in $P_B$ alone.

It will be seen that a tiny displacement on the part of the spool or movable assembly 52 of the servo valve 50, is sufficient to produce a large variation in the pressure $P_3$ and, consequently, a substantial displacement in the movable assembly 36 controlling the control valve 11. The servo valve 50 thus does duty as an amplifier stage for the control valve 11, which constitutes the power stage for controlling the pressure drop in the fuel flowing through the metering passage 8. In this manner the load-dependent droop factor of the control valve is reduced very substantially.

The operation of the control device in accordance with the variant embodiment just described, is similar to that of the device shown in FIG. 1, the controller $R_2$ which has the proportional action, simply being supplemented by the servo valve 50.

In addition to the advantages which have been set out in the preamble to the description, it will be observed that the control device in accordance with the invention makes it possible to achieve the proportional and integrating actions using the same basic elements as those already employed in conventional installations (metering value pressure drop control valve), these being adapted to their new mode of operation with the help of particularly simple elements (outlet ports A, B restrictions C, D).

What is claimed is:

1. A device for controlling an installation supplied with pressurized liquid through a piping system by varying the flow-rate of said liquid in response to changes in a given operating condition of said installation, said device comprising:
   a device for detecting the changes in said condition and producing an indication of the magnitude of those changes;
   a metering passage in said piping system;
   first adjusting means for varying the cross-sectional area of said metering passage;
   second adjusting means for varying the liquid pressure drop through said metering passage;
   a first controller responsive to the indication produced by said detecting device and controlling one of said adjusting means, said first controller being of the integrating action type; and
   a second controller also responsive to the same indication produced by said detecting device and controlling the other of said adjusting means, said controller being of the proportional action type.

2. A device according to claim 1 wherein said integrating action type controller controls the adjusting means varying the metering passage area and said proportional action type controller controls the adjusting means varying the pressure drop.

3. A device according to claim 1 wherein the detecting device comprises a pilot valve incorporating a movable spool and means for positioning said spool in response to changes in said operating condition, said pilot valve having an inlet port supplied with liquid at the pressure prevailing in the piping system upstream of the metering passage, and first and second outlet ports respectively connected with said first controller and with said second controller for furnishing said two controllers with an indication of the position of said spool, said movable spool being adapted to control the respective cross-sectional areas of said outlet ports in such a manner that the sum of said areas is substantially constant.

4. A device according to claim 3 wherein said integrating action type controller comprises a servo piston for adjusting the adjusting means used to vary the cross-sectional area of the metering passage; said servo piston being subjected on one of its faces to the pressure prevailing in a chamber supplied with liquid through said first outlet port, said chamber communicating, through a restriction, with a low-pressure space.

5. A device according to claim 3 wherein the proportional action type controller comprises a movable assembly for adjusting the adjusting means used to vary the pressure drop in the liquid flowing through the metering passage; and wherein said movable assembly is subjected on one of its faces to the action of the pressure prevailing in a chamber supplied with liquid through said second outlet port, said chamber communicating, through a second restriction, with a portion of the piping system located downstream of the metering passage.

6. A device according to claim 5 wherein said assembly comprises a servo valve associated with a power stage, which power stage controls the pressure drop through the metering passage.

7. A device according to claim 1 wherein said installation is an engine powered by fuel supplied by said piping system at a speed determined generally by the flow of said fuel through said piping system, said detecting device detects the speed of said engine, and fuel flow varies substantially as a function of said metering passage area and said pressure drop.

8. A device according to claim 7 wherein said engine includes a rotatably driven element and said detecting means detects the rotational speed of said element.

9. In a gas-turbine power plant incorporating a rotor and a combustion chamber supplied with liquid fuel through a fuel line, a device for controlling the fuel supply in response to changes in the rotor speed comprising:
   a device for detecting changes in said rotor speed and producing an indication of the magnitude thereof,
   a metering passage in said fuel line;
   first adjusting means for varying the cross-sectional area of said metering passage;
   second adjusting means for varying the fuel pressure drop through said metering passage;
   a first controller responsive to the indication produced by said detecting device and controlling one of said adjusting means, said first controller being of the integrating action type; and
   a second controller responsive to the same indication produced by said detecting device and controlling the other of said adjusting means, said second controller being of the proportional action type.

10. A device according to claim 9 wherein said integrating action type controller controls the adjusting means varying the metering passage area and said proportional action type controller controls the adjusting means varying the pressure drop.

* * * * *